June 27, 1950     E. J. SULLIVAN ET AL     2,513,216
MECHANISM FOR RELEASING MOLDED ARTICLES FROM MOLDS Filed June 4, 1947     2 Sheets-Sheet 1

Inventors
E. J. SULLIVAN
J. C. DRAPER

By Rule and Hoge,
Attorneys

June 27, 1950     E. J. SULLIVAN ET AL     2,513,216
MECHANISM FOR RELEASING MOLDED ARTICLES FROM MOLDS
Filed June 4, 1947     2 Sheets-Sheet 2

Inventors
E. J. SULLIVAN
U. C. DRAPER
By Rule and Hoge
Attorneys

Patented June 27, 1950

2,513,216

UNITED STATES PATENT OFFICE 2,513,216

MECHANISM FOR RELEASING MOLDED ARTICLES FROM MOLDS

Emmet J. Sullivan, Toledo, Ohio, and James C. Draper, Ottawa Lake, Mich., assignors to Owens-Illinois Glass Company, a corporation of Ohio Application June 4, 1947, Serial No. 752,310

8 Claims. (Cl. 18—20)

Our invention relates to apparatus for molding articles, and particularly to mechanism for releasing the molded articles from a molding element. The invention is adapted for use in molding hollow articles such as caps used as closures for bottles, jars and the like.

In form herein illustrated, the invention is shown as applied to a Lauterbach type of molding machine such as disclosed, for example, in the patent to Lauterbach, #2,155,316, April 18, 1939, Machine for Molding Plastic Materials. Such machine, as shown and described, is used for molding internally threaded caps. The molding compound is an organic plastic of the thermosetting type and is subjected to heat and pressure within the electrically heated mold and is thereby polymerized or reacted so that the molded article sets or hardens within the hot mold. After the article is thus hardened, it is removed from the mold by first withdrawing the outer die member, leaving the molded article in position on the inner screw-threaded die member or plug, and thereafter unscrewing it from the plug. Reference may be had to the above mentioned patent for a full disclosure of such machine and method of operation.

It is found that with such method of molding, wherein the lower or outer die is withdrawn from the molded article, leaving the latter tightly held in position on the heated plug, the heat supplied from the plug tends to expand the molded cap outwardly. Also, the pressure of the confined gas, incident to the molding and curing operation, builds up a pressure tending to cause doming of the article and there is also a tendency to blistering and explosion of the molded piece. An object of the present invention is to overcome these objectionable features and to this end there is provided means by which the threaded plug is automatically loosened from the molded cap by partially unscrewing it from the cap as the lower die is withdrawn. Such operation removes the molded cap from intimate contact with the source of heat which tends to expand it outwardly, thereby reducing the expansion. It further provides clearance through which the confined gas may escape, thereby relieving the pressure. Further, the tendency of the cap to expand can proceed in two directions as it is no longer limited by the plug. This reduces the degree and effect of expansion. The loosening of the molding plug eliminates or minimizes the doming or bulging of the cap and also prevents blistering and explosion of the molded piece.

Other objects of the invention will appear hereinafter.

Referring to the accompanying drawings.

Figure 4:
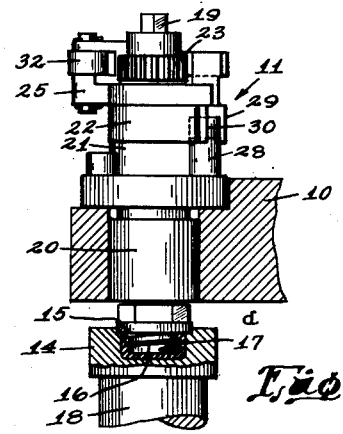
Figure 5:
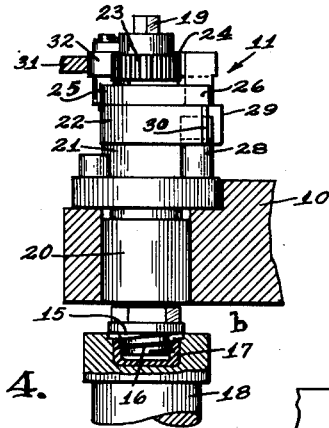
Figure 6:
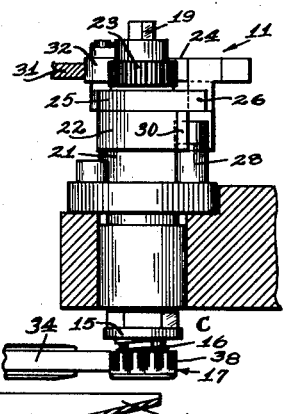
Figure 3:
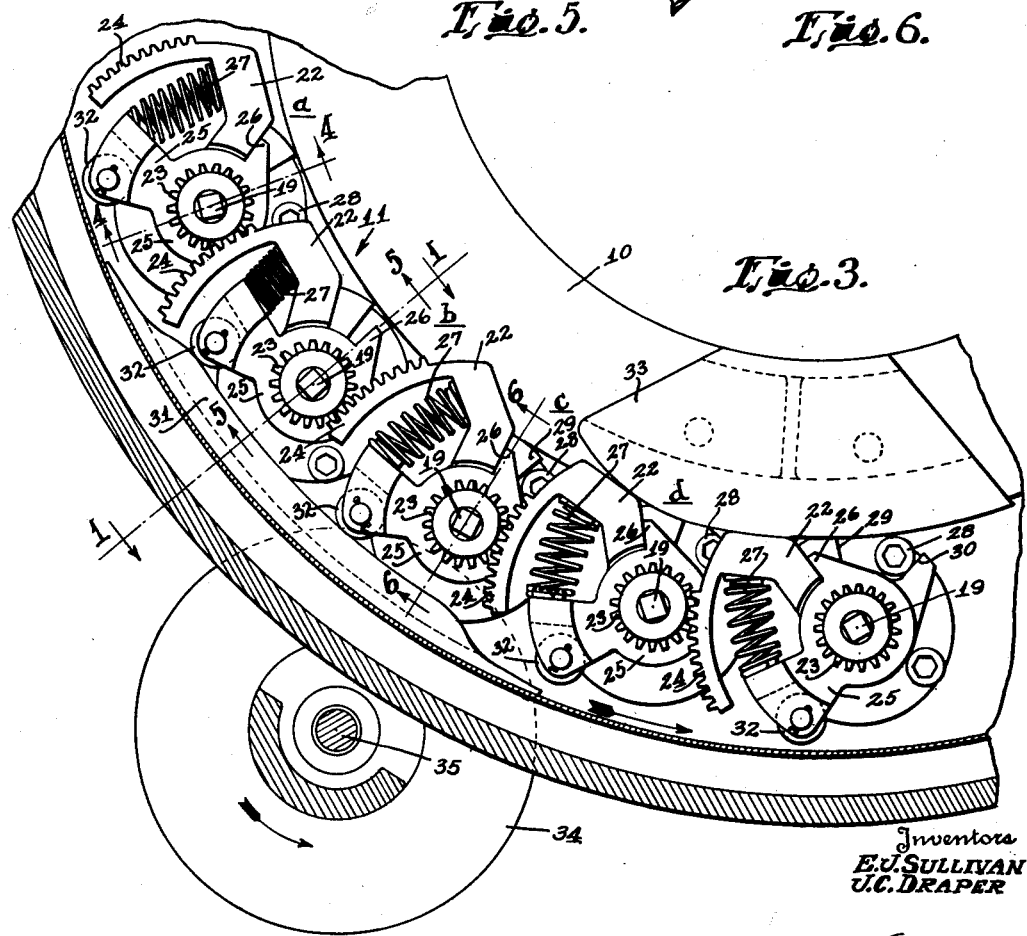
Fig. 3 is a fragmentary part-sectional plan view showing the annular series of molding units.

Figs. 4, 5 and 6 are sections at the lines 4—4, 5—5 and 6—6 respectively, on Fig. 3, said sections being taken through successive units, and thereby showing successive steps in the operation of loosening and removing a molded article from the molds.

The machine comprises a carriage 10 on which is mounted an annular series of molding units 11. The carriage is mounted for rotation in a stationary framework comprising an annular housing 12 surrounding the series of molding units and surmounted by a cover plate 13 bolted thereto.

Each molding unit comprises a female die 14 formed with an upwardly opening mold cavity, and a male die or plug 15. The latter is formed with a screw thread 16 for molding a corresponding screw thread within the cap 17. The lower die 14 is carried on a hydraulic plunger 18 which is mounted for up-and-down movement in the carriage 10. The upper die 15 is attached by a coupling sleeve 20 to the lower end of a vertical shaft or spindle 19, the shaft and coupling being journalled for rotation within the frame 10. The shaft extends upwardly through a tubular bearing 21 flanged and bolted to the carriage. Mounted on the bearing member 21 for oscillating movement about the axis of the shaft 19 is a rocker 22. Keyed to the shaft 19, above the said rocker is a pinion 23. The rocker 22 is formed with a segmental rack 24 concentric with the shaft 19 and running in mesh with the pinion 23 of the next adjoining unit.

Mounted on the bearing member 21 is a rock arm 25 above the rocker 22 and adapted for rocking movement relative to the rocker 22, limited in one direction by a stop lug 26 formed on the arm 25, and projecting into the path of the rocker 22. The rocker 22 and rock arm 25 are yieldably held in such relative position by a coil compression spring 27 interposed therebetween. The rocking movement of the rocker 22 is limited by a stop 28 attached to the bearing member 21 and extending upwardly between stop surfaces 29 and 30 on the rocker 22.

Figure 1:
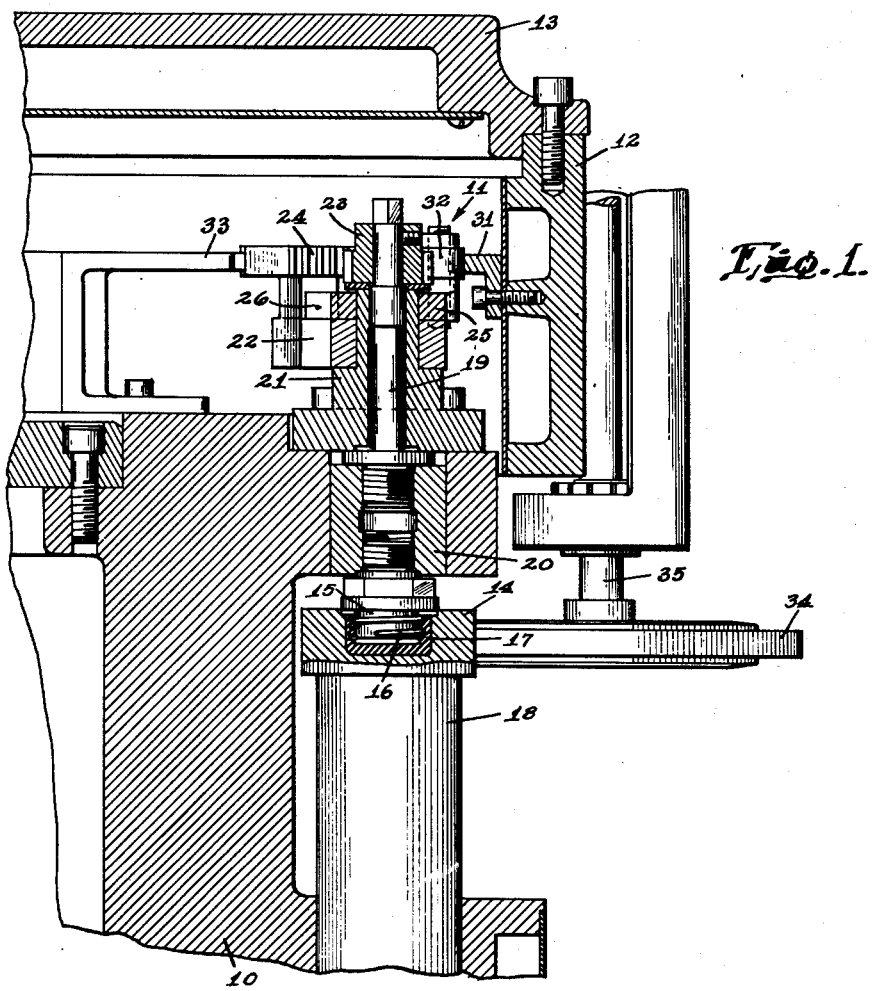
Fig. 1 is a sectional elevation of a portion of a Lauterbach type of molding machine to which the present invention is applied, the section being at the line 1—1 on Fig. 3.
Figure 2:
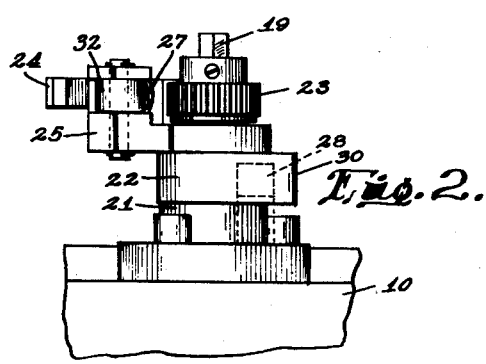
Fig. 2 is a front elevation of the upper portion of one of the molding units.

Each rock arm 25 is rocked inwardly by a stationary cam 31 (Figs. 1 and 3) extending circumferentially of the machine and on which runs a cam follower roll 32 on the rock arm. This rocking movement operates to compress the spring 27 as hereinafter described. A second cam 33 is mounted on the machine frame in position to engage the rockers 22 for swinging them outwardly together with the rock arms 25.

The operation of loosening a molded cap on the screw plug and removing the cap from the dies takes place while the molding unit is travelling through the zone illustrated in Fig. 3 in which successive units are shown at the positions a, b, c and d, with the mold carriage rotating continuously in a counterclockwise direction. When a molding unit reaches the position a, the mold is still tightly closed as shown in Fig. 4 and held closed by the upward pressure of the hydraulic plunger 18. Just before this position is reached a turning force or torque is applied to the molding plug 15 by means of the stationary cam 31 operating to swing the rock arm 25 of the unit at position b, thereby compressing the coil spring 27 and, through the rack and pinion, applying a turning force to the plug 15.

During the travel of the molding unit from position a to position b, the plunger 18 of said unit commences its downward movement, thereby releasing the upward pressure on the plug and molded cap so that the compressed spring 27 is permitted to expand and rotate the plug in a direction to partially unscrew it from the molded cap. The unscrewing movement of the plug is limited by the stop lug 26 in the path of the rocker 22 so that as the plunger 18 continues its downward movement, the cap is left loosely supported on the plug. The loosening of the plug serves to relieve the gas pressure developed during the molding and curing or setting of the cap and also permits a uniform expansion of the cap, preventing distortion and moreover, reduces the heat transfer from the plug to the molded cap, owing to the less intimate contact of the plug with the cap, thus further reducing the heating and expansion of the cap.

As the molding unit travels from position b to position c, the plunger 18 is withdrawn entirely from the molded cap and the latter brought into contact with the disk 34 mounted on the shaft 35 and rotating as indicated by the arrow, Fig. 3, in a direction to unscrew the cap and discharge it into the chute 36 (Fig. 6). The cap 17, as shown in Fig. 6 may have its exterior peripheral surface roughened or formed with corrugations 38 or the like. These serve, in the first place, to prevent rotation of the molded cap within the mold 14 when the plug is rotated. They also prevent slipping of the cap on the disk 34 and provide a gripping surface for the cap when in use.

As the molding unit travels from the position c to position d, the cam 33 swings the rocker 22 outwardly, the latter also swinging the rock arm 25. This movement of the rocker operates through its gear to rotate the pinion and thereby reset the attached molding plug for a succeeding operation.

Modifications may be resorted to within the spirit and scope of our invention.

We claim:

1. A molding machine, comprising a carriage mounted for rotation about a vertical axis, a molding unit mounted on the carriage for rotation therewith and comprising a pair of molding elements mounted for relative up-and-down movement to and from a molding position in which they are held together with a predetermined pressure, one said element being formed with a spiral molding thread, said one element being rotatable about its own axis, a rock arm connected to the last mentioned element, a spring, means for moving said rock arm against the action of said spring and thereby applying a torque to said rotatable element insufficient to cause its rotation while said elements are held together by said pressure and operable automatically to rotate said rotatable element when said pressure is relieved.

2. A machine for molding hollow internally screw-threaded caps, said machine comprising a carriage mounted for rotation about a vertical axis, a plunger mounted on the carriage for up-and-down movement, a mold mounted on the plunger and formed with a mold cavity opening upwardly, a molding plug mounted on the carriage above and in alignment with said mold cavity and positioned to enter the mold cavity when the plunger is moved upward, said plug formed with an exterior spiral thread for molding a thread on the cap as the latter is formed in the mold, a spring mounted to rotate with the carriage, a stationary cam, means operated by said cam to apply pressure to said spring when the mold reaches a predetermined position during its rotation with the carriage, means for transmitting the spring pressure to the plug and thereby applying a torque to the plug, said torque being applied in a direction for unscrewing the plug from the molded article, said cam being extended concentrically with the carriage a predetermined distance and thereby maintaining said torque during a predetermined length of travel of the plug.

3. A machine for molding hollow internally screw-threaded caps, said machine comprising a carriage mounted for rotation about a vertical axis, a plunger mounted for up-and-down movement on the carriage, a mold carried by the plunger and formed with a mold cavity, a molding plug mounted on the carriage in alignment with said mold cavity, said mold and plug being relatively movable to and from a mold closing position in which the plug is positioned within the mold cavity, said plug having a spiral molding surface thereon, a shaft connected to said plug, a pinion on said shaft, a rack in mesh with said pinion, a stationary cam, and means operated by said cam for applying spring pressure to said rack in a direction to rotate said pinion and thereby rotate the said plug in a direction for unscrewing it from a cap in the mold.

4. machine for molding hollow internally screw-threaded caps, said machine comprising a carriage mounted for rotation about a vertical axis, an annular series of molding units mounted on the carriage for rotation therewith, each said unit comprising a mold formed with a mold cavity and a molding plug adapted to enter said cavity, said plug formed with a spiral molding surface, a shaft connected to each plug for rotating it, pinions on said shafts, rockers individual to said shafts and each mounted for rocking movement on its said shaft, each said rocker formed with a segmental rack running in mesh with the said pinion of an adjoining molding unit, and automatic means for rocking each said rocker as the carriage rotates.

5. A machine for molding hollow internally screw-threaded caps, said machine comprising a carriage mounted for rotation about a vertical axis, an annular series of molding units mounted on the carriage for rotation therewith, each said unit comprising a mold formed with a mold cavity and a molding plug adapted to enter said cavity, said plug formed with a spiral molding surface, a shaft connected to each plug for rotating it, pinions on said shafts, rockers individual to said shafts and each mounted for rocking movement on its said shaft, each said rocker formed with a segmental rack running in mesh with the said pinion of an adjoining molding unit, rock arms individual to said molding units and mounted on said shafts for rocking movement, compression springs interposed between said rockers and rock arms, and a stationary cam positioned and arranged to rock said rock arms and compress each said spring when the carriage reaches a predetermined position and thereby apply a torque to each said spindle as it reaches a predetermined position.

6. A molding machine, comprising a carriage mounted for horizontal rotation, molding units mounted on the carriage for rotation therewith, each said unit comprising a plug with a spiral molding thread, vertical shafts journalled in the carriage to which the plugs are connected, pinions on said shafts, a pair of rocking elements mounted on each shaft, said elements being relatively rotatable, a coil compression spring interposed between the said elements of each pair, one said element comprising a rack running in mesh with the pinion of the next adjoining unit, and a stationary cam arranged to rock one said element of each pair in a direction to compress the said interposed spring.

7. A molding machine, comprising a carriage mounted for rotation about a vertical axis, molding units mounted to rotate with the carriage and arranged in an annular series concentric with said axis, each said unit comprising a vertical shaft journalled for rotation on the carriage, a molding element attached to each said shaft for rotation therewith, rockers individual to said units, each mounted for rotation about the axis of the said shaft, means providing a driving connection between each rocker and the shaft of the next adjoining unit, a stationary cam and means actuated thereby for swinging said rockers in one direction, and means for swinging said rockers in the opposite direction.

8. A molding machine, comprising a carriage mounted for rotation about a vertical axis, molding units mounted to rotate with the carriage and arranged in an annular series concentric with said axis, each said unit comprising a vertical shaft journalled for rotation on the carriage, a molding element attached to each said shaft for rotation therewith, pairs of rocking elements individual to said shafts and mounted for oscillating movement on said shafts, means providing a driving connection between one said element of each pair and the next adjoining shaft, a stationary cam in the path of one rocker of each said pair operable to swing said rocker in one direction, compression springs interposed between the rockers of each pair, and a second stationary cam positioned in the path of the other rockers of said pairs, said cams being positioned and arranged to swing the rockers alternately in opposite directions.

EMMET J. SULLIVAN.
JAMES C. DRAPER.

REFERENCES CITED

The following references are of record in the file of this patent:

UNITED STATES PATENTS

| Number | Name | Date |
| --- | --- | --- |
| 1,959,612 | Burke | May 22, 1934 |
| 2,137,539 | McIntash | Nov. 22, 1938 |
| 2,155,316 | Lauterbach | Apr. 18, 1939 |
| 2,371,195 | Strauss | Mar. 13, 1945 |
| 2,404,631 | Gronemeyer | July 23, 1946 |
| 2,409,142 | McCoy | Oct. 8, 1946 |
| 2,440,367 | Crapp | Apr. 27, 1948 |